United States Patent Office 3,422,094
Patented Jan. 14, 1969

3,422,094
STEROID CYCLIC SULFONES AND PROCESS OF REGENERATING KETONES
Sol J. Saum, Albany, and Robert L. Clarke, Bethlehem, N.Y., assignors to Sterling Drug Inc., New York, N.Y., a corporation of Delaware
No Drawing. Filed Oct. 11, 1966, Ser. No. 585,760
U.S. Cl. 260—239.5     9 Claims
Int. Cl. C07b *3/00;* C07c *169/10*

ABSTRACT OF THE DISCLOSURE

The tetra-S-oxide derivative of a lower-alkane $\alpha,\beta$-dithiol ketal of a ketone is subjected to alkaline aerobic conditions to regenerate the ketone. The process is particularly applicable to the steroid field. Steroid cyclic sulfones having antibacterial and antifungal activity are described.

---

This invention relates to a novel process for protecting and regenerating the carbonyl group of a ketone, and to certain novel steroid products produced thereby.

A well-known means for protecting carbonyl groups of ketones so that operations can be carried out on other portions of the molecule with reagents reactive with carbonyl groups is by formation of a ketal derivative of the carbonyl group by condensation with an alcohol, preferably a glycol such as ethylene glycol or propylene glycol. The ketal is then cleaved to regenerate the original carbonyl group by treating it with an acid.

The conventional ketal method is not practical in cases where the molecule as a whole is sensitive to acid at the stage where cleavage of the ketal is desired so that unwanted side reactions or rearrangements take place. According to the present invention, a procedure is afforded whereby the carbonyl group can be protected and then regenerated by cleavage under alkaline conditions, thereby providing a useful alternative method of temporarily blocking a reactive carbonyl group.

The novel process of the invention comprises subjecting the tetra-S-oxide derivative of a lower-alkane $\alpha,\beta$-dithiol ketal of a ketone to alkaline aerobic conditions to regenerate the original ketone. The process can be represented as follows:

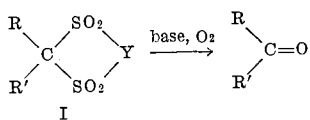

The groups R and R' are organic radicals joined through carbon to the carbonyl moiety, and they may be joined in a cycle so that the disulfone molecule (I) has a spiro structure. The divalent group Y is an $\alpha,\beta$-lower-alkylene group, preferably having from two to about six carbon atoms, and bearing at least one hydrogen atom on a carbon atom adjacent to one of the sulfonyl groups. Exemplary of such $\alpha,\beta$-lower-alkylene groups are ethylene, —CH$_2$CH$_2$—, and mono- di- or tri-alkyl-substituted ethylene, such as —CH(CH$_3$)CH$_2$—,

—CH(CH$_3$)CH(CH$_3$)—

—CH(CH$_3$)C(CH$_3$)$_2$—, —CH(C$_2$H$_5$)CH(C$_2$H$_5$)—, and the like.

Any strong base can be used in the cleavage of the disulfone I. Such strong bases include alkali metal hydroxides, lower-alkoxides, amides and hydrides. The oxygen is provided either in the form of pure oxygen or a mixture thereof with inert gases such as natural air. The strong base reacts with the disulfone to produce a water-soluble salt, probably the salt of a sulfinic acid, and the latter undergoes loss of sulfur dioxide and oxidation to give the ketone.

The disulfones of Formula I are prepared by oxidation of the corresponding disulfide of Formula II:

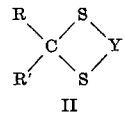

The disulfides (II) are thioketals derived in a conventional manner from the ketone RR'CO and a lower-alkane $\alpha,\beta$-dithiol. The oxidation of the disulfide (II) to the disulfone (I) can be carried out by means of any oxidizing agent known to convert sulfides to sulfones. Such oxidizing agents include hydrogen peroxide, organic peracids such as perbenzoic acid, monoperphthalic acid, peracetic acid and the like, alkali metal permanganate, nitric acid and chromic acid. Organic peracids are preferred oxidizing agents.

Any ketone possessing a carbonyl group reactive enough to form a thioketal can be used in the process of the invention. These include the simple alkanones, such as acetone, methyl ethyl ketone, dibutyl ketone, and the like; aryl-aliphatic ketones, such as acetophenone, phenyl ethyl ketone, and the like; cycloaliphatic ketones, such as cyclohexanone, cyclopentanone, 1-tetralone, 1-oxo-1,2,3,4-tetrahydrophenanthrene, camphor, menthone, and the like. Any number and type of substituents which do not interfere with the thioketal formation can be present. A particularly preferred type of ketone consists of the oxo-steroids wherein the oxo group can be in any reactive position, for example the 1-, 2-, 3-, 4-, 6-, 7-, 12-, 16-, 17 and 20-positions. The 3-oxo-steroids are a particularly preferred type of oxo-steroid because of their ready availability.

The invention also relates to novel steroid components produced during the course of the process invention. These novel steroids are steroids containing one or more $\alpha,\beta$-lower-alkylenedisulfonyl groups in said reactive positions. They are useful as intermediates in the claimed process and have also been found to be useful as antibacterial and antifungal agents when tested by standard serial dilution procedures in vitro against the organisms *Staph. aureus, Cl. welchii, Ps. aeruginosa, As. niger* and *M. albicans*.

Especially preferred types of the novel steroids of the invention are those of the formulas:

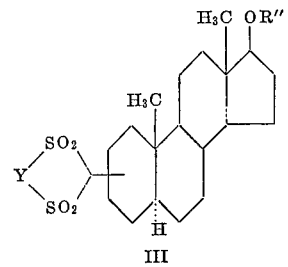

III wherein R" is hydrogen or carboxylic acyl, Y is α,β-lower-alkylene and the alkylenedisulfonyl group is attached to the 2- or the 3-position of the steroid nucleus; and

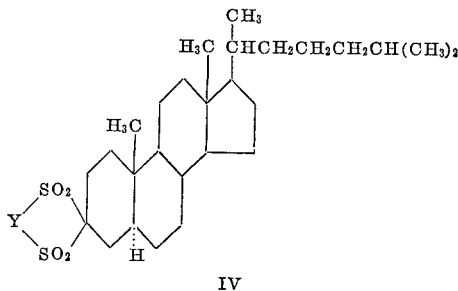

IV wherein Y is α,β-lower-alkylene.

In the compounds of Formula III, the carboxylic acyl groups which R" can represent preferably have from one to twelve carbon atoms and molecular weights less than about 250. Representative of the lower-carboxylic acyl radicals which can be present are lower-alkanoyl, e.g., acetyl, propionyl, isobutyryl, caproyl, heptanoyl, octanoyl, dodecanoyl, trimethylacetyl, and the like; cycloalkyl-lower-alkanoyl wherein cycloalkyl has 5–6 ring members, e.g., β-cyclopentylpropionyl, β-cyclohexylpropionyl, and the like; benzoyl; phenyl-lower-alkanoyl or -alkenoyl, e.g., phenylacetyl, β-phenylpropionyl, cinnamoyl, and the like; phenoxy-lower-alkanoyl, e.g., p-chlorophenoxyacetyl; carbamyl, including unsubstituted carbamyl, N-lower-alkylcarbamyl and N,N-di-lower-alkylcarbamyl; and pyridyl-carbonyl, e.g., nicotinoyl and isonicotinoyl. In acyl radicals containing a phenyl group, the benzene ring thereof can be unsubstituted or substituted by any number and kind of substituents inert under the reaction conditions used, including lower-alkyl, for example p-tolyl; lower-alkoxy, for example 3,4-dimethoxyphenyl; halogen (including fluorine, chlorine, bromine and iodine), for example 2-bromophenyl. The lower-alkyl and lower-alkoxy groups preferably have from one to four carbon atoms.

The following examples will further illustrate the invention without the latter being limited thereby.

Example 1

(a) 17β-acetoxy-5α-androstan - 3 - one ethanedithiol ketal.—A solution of 7.64 g. of 17β-acetoxy-5α-androstan-3-one in 75 ml. of acetic acid was treated with 7 ml. of ethanedithiol and 5 ml. of boron trifluoride etherate. The mixture was allowed to stand at room temperature for thirty minutes and then diluted with water. The solid product which separated was collected by filtration and dried to give a quantitative yield of 17β-acetoxy-5α-androstan-3-one ethanedithiol ketal, M.P. 183–185° C. (uncorr.).

(b) 17β-acetoxy-3,3-ethylenedisulfonyl - 5α - androstane.—To a solution of 9.25 g. of 17β-acetoxy-5α-androstan-3-one ethanedithiol ketal in 250 ml. of tetrahydrofuran was added 400 ml. of a solution of monoperphthalic acid in ether (100 mg./ml.). The reaction mixture was allowed to stand at room temperature for three days, and the solid product was collected by filtration and washed with 400 ml. of tetrahydrofuran. The combined filtrate and washings were treated further with 150 ml. of monoperphthalic acid in ether (100 mg./ml.). The solid which separated was collected, and the filtrate was washed with sodium carbonate solution and sodium chloride solution, dried over anhydrous sodium sulfate and concentrated to dryness. The total solid product was recrystallized from methanol to give 5.18 g. of 17β-acetoxy-3,3-ethylenedisulfonyl-5α-androstane, M.P. 316–318° C. (uncorr.);

$$[\alpha]_D^{25} = +12.2°$$

(1% in chloroform).

(c) Cleavage.—A mixture of 2 g. of 17β-acetoxy-3,3-ethylene-disulfonyl-5α-androstane, 2 g. of sodium methoxide and 150 ml. of methanol was refluxed under nitrogen for two hours. The solution was concentrated to half the original volume, 400 ml. of water added, and the mixture extracted with a small volume or ether. The aqueous layer was heated for thiry minutes on a steam bath to remove the ether, and oxygen gas was bubbled through the solution for ten minutes. The mitxure was allowed to stand overnight, and the solid product which had separated was collected by filtration, washed with water, dissolved in acetone and concentrated to dryness. The residue was recrystallized from acetone to give 600 mg. of 5α-androstan-17β-ol-3-one, M.P. 176–179° C. (uncorr.). The melting point of a mixture of this product with an authentic sample of 5α-androstan-17β-ol-3-one showed no depression.

By replacing the ethanedithiol in the foregoing preparation, part (a), with a molar equivalent amount of 1,2-propane-dithiol or 2,3-butanedithiol, there can be prepared 17β-acetoxy-5α-androstan-3-one 1,2-propanedithiol ketal or 17β-acetoxy-5α-androstan-3-one 2,3-butanedithiol ketal, which can then be oxidized to 17β-acetoxy-3,3-(1,2-propylenedisulfonyl)-5α-androstane or 17β-acetoxy - 3,3 - (2,3-butanedisulfonyl)-5α-androstane and cleaved to yield 5α-androstan-17β-ol-3-one.

The foregoing sequence of reactions can also be carried out with other ketones, for example, acetone, methyl ethyl ketone, dihexyl ketone, acetophenenone, cyclohexanone, 1-oxo-tetralin, 2-oxo-decalin, 2-oxo-1,2,3,4 - tetrahydrophenanthrene, camphor, menthone and the like, to form the respective ethanedithiol ketals, followed by oxidation to the ethylenedisulfonyl derivatives and cleavage to the original ketones.

By replacing the 17β-acetoxy-5α-androstan-3-one in the foregoing preparation by

17β-hydroxy-5α-androstan-3-one,
17β-caproyloxy-5α-androstan-3-one,
17β-(β-cyclohexylpropionoxy)-5α-androstan-3-one,
17β-(p-methoxybenzoyloxy)-5α-androstan-3-one,
17β-(β-phenylpropionoxy)-5α-androstan-3-one,
17β-cinnamoyloxy-5α-androstan-3-one,
17β-(p-chlorophenoxyacetoxy)-5α-androstan-3-one, or
17β-nicotinoyloxy-5α-androstan-3-one, there can be obtained, respectively, 17β-hydroxy-3,3-ethylenedisulfonyl-5α-androstane,
17β-caproyloxy-3,3-ethylenedisulfonyl-5α-androstane,
17β-(β-cyclohexylpropionoxy)-3,3-ethylenedisulfonyl-5α-androstane,
17β-(p-methoxybenzoyloxy)-3,3-ethylenedisulfonyl-5α-androstane,
17β-(β-phenylpropionoxy)-3,3-ethylenedisulfonyl-5α-androstane,
17β-cinnamoyloxy-3,3-ethylenedisulfonyl-5α-androstane,
17β-(p-chlorophenoxyacetoxy)-3,3-ethylenedisulfonyl-5α-androstane, or
17β-nicotinoyloxy-3,3-ethylenedisulfonyl-5α-androstane.

17β-hydroxy-3,3-ethylenedisulfonyl-5α-androstane can be caused to react with an excess of hexamethyltrisilazane in the presence of a catalytic amount of trimethylchlorosilane in ether or tetrahydrofuran solution to give the 17-trimethylsilyl ether of 17β-hydroxy-3,3-ethylenedisulfonyl-5α-androstane. The latter can be cleaved under alkaline aerobic conditions as described above to give the 17-trimethylsilyl ether of 17β-hydroxy-5α-androstan - 3 - one, which cannot be obtained by cleavage of the conventional ketal because trimethylsilyl ethers are extremely sensitive to acid.

Example 2

(a) 17β-acetoxy-5α-androstan-2-one ethanedithiol ketal was prepared from 5 g. of 17β-acetoxy-5α-androstan-2-one, 5 ml. of boron trifluoride etherate and 6 ml. of ethanedithiol in 60 ml. of acetic acid according to the procedure of Example 1, part (a). The product was recrystallized from a methanol-methylene dichloride mixture to give 5.44 g. of 17β-acetoxy-5α-androstan-2-one ethanedithiol ketal, M.P. 203.5–205° C.

(b) 17β-acetoxy-2,2 - ethylenedisulfonyl-5α-androstane was prepared from 5 g. of the thio ketal of part (a) and 200 ml. of monoperphthalic acid in ether (100 mg./ml.) according to the procedure of Example 1, part (b). There was thus obtained 4.6 g. of 17β-acetoxy-2,2-ethylenedisulfonyl-5α - androstane, colorless prisms, M.P. 258.4–260.4° C. (dec.) (corr.) after three recrystallizations from a methanol-methylene dichloride mixture; $[\alpha]_D^{25} = +17.0°$ (1% in chloroform).

17β-acetoxy-2,2-ethylenedisulfonyl-5α-androstane can be cleaved by the procedure of Example 1, part (c) to yield 5α-androstan-17β-ol-2-one.

Example 3

(a) Cholestan-3-one ethanedithiol ketal was prepared from 10 g. of cholestan-3-one, 8 ml. of boron trifluoride etherate and 10 ml. of ethanedithiol in 120 ml. of acetic acid according to the procedure of Example 1, part (a). The product was recrystallized from methanol to give 11.17 g. of cholestan-3-one ethanedithiol ketal, M.P. 142–144° C.

(b) 3,3-ethylenedisulfonylcholestane was prepared from 10 g. of the thio ketal of part (a) and 500 ml. of monoperphthalic acid in ether (100 mg./ml.) according to the procedure of Example 1, part (b). There was thus obtained 10 g. of 3,3-ethylenedisulfonylcholestane, colorless plates, M.P. 293.0–294.0° C. (corr.) when recrystallized from a methanol-methylene dichloride mixture; $[\alpha]_D^{25} = +26.9°$ (1% in chloroform).

(c) Cleavage.—A mixture of 2 g. of 3,3-ethylenedisulfonylcholestane, 430 mg. of sodium methoxide and 200 ml. of methanol was refluxed overnight. The reaction mixture was concentrated to one-half its original volume, water added, and the mixture filtered. Oxygen gas was bubbled through the filtrate for one hour, and the solution extracted with ether and pentane. The aqueous layer was heated on a steam bath for one hour and extracted with ether and pentane. All the extracts were combined, dried over anhydrous sodium sulfate, and concentrated to dryness. The residue was recrystallized from acetone to give 520 mg. of cholestan-3-one, identical with authentic material as determined by infrared spectrum and mixed melting point.

By the procedures described hereinabove, cholestane-3,6-dione 3-mono(ethanedithiol ketal), cholestane-3,6-dione 3,6-di(ethanedithiol ketal), cholestan-4-one ethanedithiol ketal, cholestan-4α-ol-3-one ethanedithiol ketal, ethyl 3,7,12-trioxocholanate 3,7,12 - tris(ethanedithiol ketal), ethyl 3,7,12-trioxocholanate 3,7,12-tris(1,2-propanedithiol ketal), 22a,5β-spirostan-3α-ol-7,11-dione 7-mono(ethanedithiol ketal), and 3β-hydroxy-pregnan-20-one ethanedithiol ketal can be oxidized, respectively, to give 3,3-ethylenedisulfonylcholestan-6 - one, 3,3;6,6-bis-(ethylenedisulfonyl)cholestane, 4,4 - ethylenedisulfonylcholestane, 3,3-ethylenedisulfonylcholestan-4α-ol, ethyl 3,3;7,7;12,12-tris(ethylenedisulfonyl)cholanate, ethyl 3,3;7,7;12,12-tris(1,2 - propylenedisulfonyl)cholanate, 7,7-mono(ethylenedisulfonyl) - 22a,5β - spirostan-3α-ol-11-one, and 20,20-ethylenedisulfonyl-3β-hydroxypregnane. The foregoing alkylenedisulfonyl compounds can be subjected to alkaline aerobic conditions according to the procedures described above in Examples 1(c) and 3(c) to yield the parent ketones.

Similarly, 17β-hydroxyandrostan-1-one or 3-methoxy-1,3,5(10)-estratrien-16-one can be converted to the respective ethanedithiol ketals and oxidized to 1,1-ethylenedisulfonylandrostan-17β-ol or 16,16-ethylenedisulfonyl-3-methoxy-1,3,5(10)-estratriene. The latter can be cleaved under alkaline aerobic conditions to the parent ketones.

We claim:

1. In a process for protecting and regenerating the carbonyl group of a ketone possessing a carbonyl group reactive enough to form a thioketal, the step which comprises subjecting the tetra-S-oxide derivative of a lower-alkane α,β-dithiol ketal of the ketone to alkaline aerobic conditions to regenerate the original ketone.

2. A process according to claim 1 in which the ketone is an oxo-steroid.

3. A process according to claim 1 in which the ketone is a 3-oxo-steroid.

4. A steroid having an α,β-lower-alkylene disulfonyl group in the 2- or 3-position, said steroid being a member of the androstane or cholestane series.

5. A steroid according to claim 3 having the formula

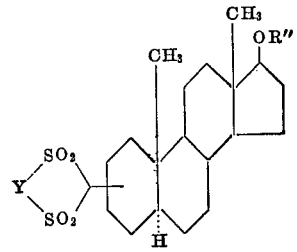

wherein R″ is hydrogen or carboxylic acyl, Y is α,β-lower-alkylene, and the alkylenedisulfonyl group is attached to the 2- or the 3-position of the steroid nucleus.

6. 17β-acetoxy-2,2-ethylenedisulfonyl - 5α-androstane, according to claim 5, wherein R″ is acetyl, Y is ethylene, and the ethylenedisulfonyl group is attached to the 2-position of the steroid nucleus.

7. 17β-acetoxy-3,3-ethylenedisulfonyl - 5α-androstane, according to claim 5, wherein R″ is acetyl, Y is ethylene, and the ethylenedisulfonyl group is attached to the 3-position of the steroid nucleus.

8. A steroid according to claim 3 having the formula

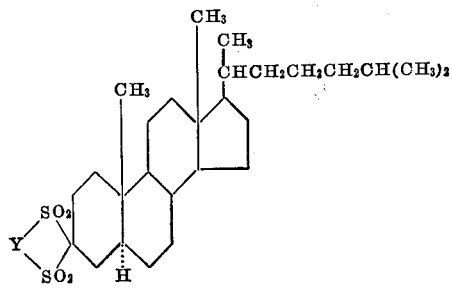

wherein Y is α,β-lower-alkylene.

9. 3,3-ethylenedisulfonylcholestane, according to claim 8, wherein Y is ethylene.

No references cited.

ELBERT L. ROBERTS, *Primary Examiner.*

UNITED STATES PATENT OFFICE
CERTIFICATE OF CORRECTION

Patent No. 3,422,094                                                 January 14, 1969

Sol J. Daum et al.

It is certified that error appears in the above identified patent and that said Letters Patent are hereby corrected as shown below:

In the heading to the printed specification, line 4, "Sol J. Saum" should read -- Sol J. Daum --. Column 2, line 42, "components" should read -- compounds --. Column 4, line 25, "acetophenenone" should read -- acetophenone --. Column 6, line 21, the claim reference numeral "3" should read -- 4 --; line 44, the claim reference numeral "3" should read -- 4 --.

Signed and sealed this 17th day of March 1970.

(SEAL)
Attest:

Edward M. Fletcher, Jr.                                  WILLIAM E. SCHUYLER, JR.
Attesting Officer                                                 Commissioner of Patents